United States Patent Office 2,901,510
Patented Aug. 25, 1959

2,901,510

HEXACHLORO-5-PHENYLDIAMINE BICYCLO-(2.2.1)-2-HEPTENE

Hyman M. Molotsky and Sidney B. Richter, Chicago, Ill., assignors to Velsicol Chemical Corporation, Chicago, Ill., a corporation of Illinois No Drawing. Application August 16, 1956
Serial No. 604,329

6 Claims. (Cl. 260—578)

This invention relates to the production of new compositions of matter. More specifically, the present invention relates to the production of new halogenated diamines which are useful in the production of fire resistant cured epoxy resins. The composition of the present invention has the structure:

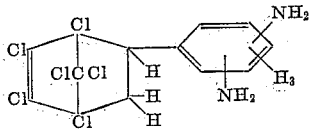

and is termed a 1,2,3,4,7,7-hexachloro-5-phenyldiamine-bicyclo (2.2.1)-2-heptene.

The compound of the present invention is useful as a curing agent for epoxy resins containing epoxide groups. In particular, resins which are formed by aqueous alkaline condensation of epichlorohydrin and bisphenol are advantageously cured by the product of the present invention.

While diamines have heretofore been used as condensation or curing agents with epoxy resins, they have in general been hydrocarbon diamines such as phenylene diamine, and the epoxy resins which were cured therewith are flammable and do not have adequate heat resistance.

In addition to their use as curing agents, the new compositions of the present invention have utility as fungicides, miticides and insecticides.

It is therefore an object of this invention to prepare new compositions of matter useful in the production of polymeric materials.

Another object of this invention is the preparation of new halogenated compositions of matter.

Still another object of this invention is the preparation of new halogenated diamines.

Still another object of this invention is the preparation of insecticidally active compositions of matter.

Other objects, features and advantages of the present invention will become apparent from the following description.

The compositions of the present invention are useful to produce cured epoxy resins which are fire and heat resistant and have excellent physical properties as regards strength, crush resistance, impact resistance, dielectric strength, and the like.

Epoxy resins cured with the diamine of the present invention are useful as potting resins, casting resins, dip resins, saturants for fiberglass, electrical insulators and the like where fire and heat resistant properties are especially desirable.

The cure of epoxy resins as above described takes place with other well-known diamines by reaction of the amine hydrogens with the epoxide groups. Mixtures of the diamines of the present invention and the epoxy resins have relatively long pot lives, an advantageous feature for certain applications.

The compositions of the present invention are solids and as such are particularly well suited for use as curing agents for epoxy resins, since liquid and more volatile diamines could not readily be used at elevated temperatures without added hazard of toxic fumes.

In addition, the compositions of the present invention have utility as insecticides, miticides and fungicides.

The halogenated diamines of the present invention may be made by several methods. One mode of preparation involves the reduction of the corresponding dinitrophenyl-hexachlorobicycloheptene by one of the means known to the art for the reduction of dinitro compounds. The 2,4-dinitrophenyl adduct may be prepared by nitration of the Diels-Alder adduct of hexachlorocyclopentadiene and styrene. The 3,4-dinitrophenyl-hexachlorocyclopentadiene adduct and the 3,5-dinitrophenyl-hexachlorocyclopentadiene adduct may be prepared by adducting 3-nitrostyrene and hexachlorocyclopentadiene, nitrating the adduct, and recovering the desired product by fractional crystallization.

Another method for the preparation of the diamines of the present invention involves reacting a dichloro styrene with ammonia, adducting the resulting diamino styrene with hexachlorocyclopentadiene, and recovering the product of the composition of the present invention. Thus, by starting with 3,5-dichlorostyrene, ammoniating it and adducting the product thereof in a Diels-Alder manner with hexachlorocyclopentadiene, the 3-5-diaminophenyl-1,2,3,4,7,7-hexachlorobicyclo (2.2.1)-2-heptene is recovered as the product.

The aforementioned adductions are carried out using the hexachlorocyclopentadiene reactant as a solvent, and the adduction temperatures may vary from about 70° C. to about 220° C. The ratio of reactants should be at least equimolar but an excess of hexachlorocyclopentadiene can be used as solvent; or, if desired, other inert solvents may also be utilized. However, the use of additional solvents is neither necessary nor preferred. The adduction time will vary with the temperature and dienophile but is generally from about 30 minutes to about 48 hours.

The following examples will illustrate the preparation of the diamino compounds of the present invention:

EXAMPLE I

*Adduction of hexachlorocyclopentadiene and styrene*

Hexachlorocyclopentadiene (5 moles; 1364 g.) was added to a glass reaction vessel equipped with stirrer, thermometer, reflux condenser and heating mantle and heated to 110–125° C. In a three-hour period styrene (5 moles; 520.7 g.) was added below the surface of the heated hexachlorocyclopentadiene while maintaining the latter at a temperature between 110–125° C. The warm adduction product was then crystallized from methanol by cooling to room temperature and filtering. 1736 grams of crystals with a melting point of 73.0–74.0° C. were obtained.

EXAMPLE II

*Nitration of hexachlorocyclopentadiene-styrene adduct*

1,005 grams (2.66 moles) of the hexachlorocyclopentadiene-styrene adduct prepared in Example I and 1700 ml. of concentrated sulfuric acid (specific gravity—1.84) were added to a glass reaction vessel equipped with stirrer, thermometer, reflux condenser and heating mantle. The mixture was then heated to 85° C. and while continuously stirring, 750 ml. of fuming nitric acid (specific gravity—1.50) were added uniformly over a two-hour period. During the nitric acid addition, the temperature was maintained at 85–90° C. by means of external cooling. An additional 150 ml. of fuming nitric acid were added while maintaining the reaction mixture at 85–110°

C. The reaction mixture was kept at this temperature for 6 hours after the completion of the addition. At the end of the six-hour period, it was cooled, the acid fraction decanted and the solid product washed with water. It was then washed with sodium bicarbonate solution and water, air dried, and recrystallized from isopropyl alcohol. Hexachlorocyclopentadiene-2,4-dinitrostyrene adduct (923 g.) with a melting point of 180.5–182° C. was obtained. The pure product was analyzed for $C_{13}H_6Cl_6N_2O_4$

|   | C | H | Cl |
|---|---|---|---|
| Theoretical | 33.42 | 1.30 | 45.53 |
| Found | 33.49 | 1.39 | 45.77 |

EXAMPLE III

*Reduction of product of Example II to the desired diamine composition*

1,2,3,4,7,7 - hexachloro - 5 - (2,4-dinitrophenyl)-bicyclo (2.2.1)-2-heptene (95 g.; 0.203 moles) prepared in Example II and benzene (400 ml.) were added to a glass reaction vessel equipped with stirrer, thermometer, reflux condensor and heating mantle. Water (50 g.) was added to the mixture which then was heated to reflux temperature. With vigorous stirring, iron powder (200 g.) "reduced by hydrogen" was added over a period of 15–20 minutes. Concentrated hydrochloric acid (50 ml.) was then added dropwise over a period of one hour after which the reaction mixture was maintained at the reflux temperature for an additional three hours. The hot mixture was filtered, washed with benzene, and the wash combined with the filtrate. This composite was washed with water, treated with activated carbon, and concentrated by evaporation to about 20% of its original volume. Heptane (3 liters) was added and the mixture was then concentrated by evaporation to about 50% of its volume to remove any trace of benzene. The product obtained by filtering the above mixture weighed 58 grams, had a melting point of 167–168° C., and was analyzed for $C_{13}H_{10}Cl_6N_2$:

|   | C | H | Cl | N |
|---|---|---|---|---|
| Theoretical | 38.35 | 2.48 | 52.27 | 6.88 |
| Found | 38.47 | 2.57 | 52.20 | 6.90 |

EXAMPLE IV

*Preparation of 1,2,3,4,7,7 - hexachloro - 5 - (m-aminophenyl)-bicyclo-(2.2.1)-2-heptene*

Into a 100 ml., 3-necked flask equipped with reflux condenser, stirrer and dropping funnel was placed hexachlorocyclopentadiene (0.1 mole; 27.3 g.) and t-butyl catechol (0.1 g.). The material was maintained at a temperature of 125–130° C. and m-nitro styrene (14.9 g.; 0.1 mole) containing t-butyl catechol (0.1 g.) was added dropwise through the dropping funnel to the warm reaction mixture over a one-hour period. After addition was complete the mixture was heated an additional half hour. The reaction mixture was then dissolved in 95% ethanol, filtered and cooled. Thirty-five grams of crystalline material, melting at 108–109° C. were recovered. Recrystallization from ethyl acetate gave a product melting at 111.5–112.0° C.

EXAMPLE V

*Preparation of the 5-(2,5-diaminophenyl)-hexachlorobicycloheptene*

Hexachlorocyclopentadiene-m-nitro-phenylstyrene adduct (1125 g.; 2.66 moles) prepared in Example IV and concentrated sulfuric acid (50 ml.) (specific gravity—1.84) is added to a glass reaction vessel equipped with stirrer, thermometer, reflux condenser and heating mantle. The mixture is then heated to 85° C. and while continuously stirring 375 ml. of fuming nitric acid (specific gravity—1.50) are added uniformly over a two-hour period. During the nitric acid addition, the temperature is maintained at 85–90° C. by means of external cooling. An additional 75 ml. of fuming nitric acid are added while keeping the reaction mixture of 95–110° C. The mixture is maintained at this temperature for six hours after the completion of the addition. At the end of the six-hour period, the reaction mixture is cooled, the acid fraction decanted, and the solid product washed with water. By fractional crystallization the desired 1,2,3,4,7,7 - hexachloro - 5 - (2,5 - dinitrophenyl) - bicyclo (2.2.1)-2-heptene is obtained. Reduction of the above product as described in Example III results in a fine crystalline material which on recrystallization from heptane is identified as substantially pure 1,2,3,4,7,7-hexachloro - 5 - (2,5 - diaminophenyl) - bicyclo-(2.2.1)-2-heptene.

EXAMPLE VI

*Preparation of 1,2,3,4,7,7-hexachloro-5-(3,5-diaminophenyl)-bicyclo (2.2.1)-2-heptene*

3,5-dichlorostyrene (173 g.; 1.0 mole) liquid ammonia (170.0 g.; 10.0 moles) are placed in a bomb and heated to 100° C. for eight hours. The product recovered from the bomb at the completion of the ammonolysis is 3,5-diaminostyrene. This substituted styrene is then adducted with hexachlorocyclopentadiene in a Diels-Alder manner as follows:

Into a 100 ml., 3-necked flask equipped with reflux condenser, stirrer and dropping funnel is placed hexachlorocyclopentadiene (27.4 g.; 0.1 mole) and t-butyl catechol (0.1 g.). The material is maintained at a temperature of 125–130° C. and 3,5-diaminostyrene (13.4 g.; 0.1 mole) containing 0.1 g. t-butyl catechol is added dropwise through the dropping funnel to the warm reaction mixture over a one-hour period. After addition is complete, the mixture is heated an additional half hour. The reaction mixture is then dissolved in 95% ethanol filtered and cooled. The product recrystallized from ethyl acetate is substantially pure 1,2,3,4,7,7-hexachlorobicyclo - 5 - (3,5-diaminophenyl)-bicyclo-(2.2.1)-2-heptene.

It should be noted that this new compound of Example VI can also be prepared by the aforementioned method of reduction of the corresponding dinitro compound, a method applicable to the preparation of all of the 1,2,3,4,7,7 - hexachlorobicyclo-5-(diaminophenyl)-bicyclo (2.2.1)-2-heptenes of the present invention. Thus, by reduction of the 3,4-dinitrophenyl composition, the product will be the 3,4-diaminophenyl; reduction of the 2,6-dinitrophenyl will produce the 2,6-diamine; etc.

The diamines of the present invention are useful in curing epoxy resins and in particular are useful in curing epoxy resins which are derived from condensation of epichlorohydrin and bis-phenol. Other epoxides which are not resins in themselves can also be cured to resinous products, such as for example bis-epoxy cyclopentyl ether.

Generally, the product of the present invention is useful in curing liquid epoxy resins such as above described. Exemplary of such resins is a product sold under the trade name of Epon 828 which is a liquid having an epoxide equivalent of 1 mole for about 200 grams of resin. Other amines such as phenylene diamine have been used commercially for such applications.

The amount of diamine utilized is calculated from the number of moles of epoxide available either in the compound or in the epoxy resin. For example, with diamines in general ¼ mole is required to cure one mole of epoxide. As above illustrated, the liquid epoxy resins have variable amounts of epoxide per unit weight of resin. Other mole ratios of diamine to epoxide can also be utilized, but it is preferred to keep the above described ratio which is approximately the stoichiometric amount.

The following example will illustrate the procedure and method of curing an epoxy resin with the present novel diamine compound:

EXAMPLE VII

To 6.8 grams of an epoxy resin formed from the condensation of epichlorohydrin and bis-phenol (sold under trade name Epon 828) was added 3.7 grams of the diamine prepared in Example III. The reactants were mixed with heating at about 90–100° C. and poured into a test tube. The test tube was maintained at 95–100° C. for three hours, at which time the mixture was substantially hard. Further heating at 100° C. for ten hours had no apparent effect. The temperature was then raised to 150° C. at which temperature the cured epoxy resin was resistant to deformation. The resin was fire resistant and was self-extinguishing after removal from an oxidizing flame.

The mixing operation is standard procedure and since the diamine is solid, warming is necessary to obtain adequate mixing of the reactants. The rate of cure of the epoxy resins with the diamine of the present invention varies in an inverse manner with the temperature of cure. Thus, at higher temperatures, the cure is complete to hardness in a shorter time than at lower temperatures.

These fire resistant epoxy resins are useful as potting resins for electrical elements such as coils. They are resistant to heat and also resistant to burning, which is especially valuable in electrical applications, but which may also be utilized in other industrial applications.

As previously discussed, the compositions of the present invention are solids which have a rather low vapor pressure. Liquid diamines and some solid diamines used for curing epoxy resins are rather volatile and present a toxic hazard in view of this volatility. The present compounds' low volatility reduces this well-known toxic hazard a considerable degree and makes industrial handling somewhat safer than is ordinarily possible.

In addition to their aforementioned utility as a curing agent, the new compositions have value as miticites, fungicides and insecticides as shown in the following tables:

TABLE 1

Miticide test

The 1,2,3,4,7,7-hexachloro-5-(2,4-diaminophenyl)-bicyclo (2.2.1)-2-heptene was formulated as a 10% wettable powder, dispersed in water at a concentration of 0.4% actual compound and applied by dipping mite-infested cranberry bean plants therein.

|  | 72 Hours After Treatment ||
|---|---|---|
|  | Percent Mortality | Plant Injury |
| 1,2,3,4,7,7-hexachloro-5-(2,5-diaminophenyl)-bicyclo (2.2.1)-2-heptene | 71.4 | 0 |
| Untreated | 0 | 0 |

TABLE 2

Insecticide test

The 1,2,3,4,7,7-hexachloro-5-(2,4-diaminophenyl)-bicyclo (2.2.1)-2-heptene was formulated into a 10% wettable powder, dispersed in water at concentration of 0.4% actual chemical and applied to caged pea aphids by spraying at 20 pounds pressure for five seconds. The treated insects were then caged on untreated Windsor Broad Bean Plants.

Percent mortality 48 hours after treatment
1,2,3,4,7,7-hexachloro - 5 - (2,4-diaminophenyl)-bicyclo (2.2.1)-2-heptene _____ 83.4
Untreated _____ 0

TABLE 3

Fungicide test

Measured quantities of spores were placed on glass slides in contact with the compound being tested. Percentage germination of spores is then determined for each treatment after 24 hours incubation at 72° F.

Percent Spore Germination at Concentrations (P.P.M.) Indicated

|  | Sclerotinia fructicola Spores |||
|---|---|---|---|
|  | 1,000 | 100 | 10 |
| 1,2,3,4,7,7-hexachloro-5-(2,4-diaminophenyl)-bicyclo-(2.2.1)-2-heptene | 2 | 10 | 63 |
| Check | 95 |  |  |

It is evident from the above data that the compounds of the present invention are unusually versatile, exhibiting a high degree of toxicity to many organisms in addition to their utility as curing agents for epoxy resins. The compounds of the present invention in pesticide applications may be applied and utilized as a sole active ingredient dispersed in carriers such as dusts, solvents, aqueous dispersions or other carriers frequently used in the art. In addition, the compositions of the present invention can be used in combination with other insecticides and fungicides.

We claim:

1. A compound of the structure:

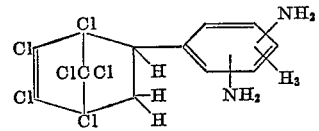

2. A compound of the structure:

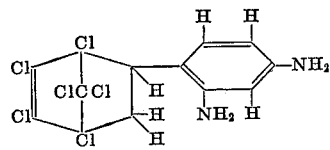

3. A compound of the structure:

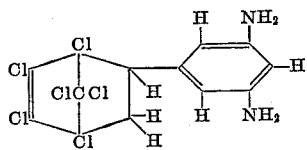

4. A compound of the structure:

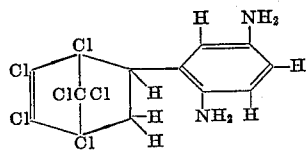

5. A compound of the structure:

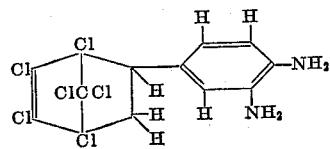

6. A compound of the structure:
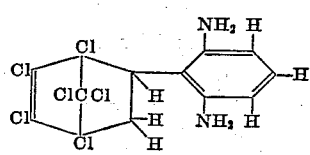
References Cited in the file of this patent
UNITED STATES PATENTS
2,673,172   Polen et al. _____ Mar. 23, 1954
2,712,030   Polen _____ June 28, 1955
OTHER REFERENCES
McBee et al.: Journal of the Chemical Society, vol. 77; p. 388 relied on (1955).

UNITED STATES PATENT OFFICE

CERTIFICATE OF CORRECTION

Patent No. 2,901,510                                                     August 25, 1959

Hyman M. Molotsky, et al.

It is hereby certified that error appears in the printed specification of the above numbered patent requiring correction and that the said Letters Patent should read as corrected below.

Column 2, line 72, for "85—110°" read -- 95—110° --.

Signed and sealed this 23rd day of February 1960.

(SEAL)
Attest:

KARL H. AXLINE                                                 ROBERT C. WATSON
Attesting Officer                                             Commissioner of Patents